United States Patent

Pierson

[15] 3,707,198
[45] Dec. 26, 1972

[54] SUSPENSION SYSTEM FOR TRACKED VEHICLES

[72] Inventor: Neil W. Pierson, P.O. Box 98, Roseau, Minn. 56751

[22] Filed: Nov. 27, 1970

[21] Appl. No.: 93,047

[52] U.S. Cl. ............... 180/5 R, 180/9.54, 305/27
[51] Int. Cl. ............................................ B62m 27/02
[58] Field of Search ...... 180/5, 9.54, 9.5; 305/27, 22, 305/23, 28

[56] References Cited

UNITED STATES PATENTS

| | | | |
|---|---|---|---|
| 3,404,745 | 10/1968 | Smieja | 180/5 R |
| 2,925,873 | 2/1960 | La Porte | 180/5 R |
| 1,365,430 | 1/1921 | Wickersham | 180/9.5 X |
| 1,371,716 | 3/1921 | Wickersham | 180/9.54 |
| 3,446,303 | 5/1969 | Trapp | 305/22 X |
| 3,613,810 | 10/1971 | Hetteen | 180/5 R |
| 3,613,811 | 10/1971 | Brandli | 180/5 R |

*Primary Examiner*—Richard J. Johnson
*Attorney*—Wicks & Nemer

[57] ABSTRACT

A new suspension system for tracked vehicles is disclosed by means of its application to a snowmobile including body, motor, bogie frame, track mounted on the bogie frame, and drive mechanism connected between the bogie frame and the track to propel the snowmobile. A preferred embodiment of the suspension system of the present invention as applied to such snowmobiles includes a pair of front linkage arms pivotally and symmetrically connected between a drive shaft of the drive mechanism and the front portion of the bogie frame, a pair of upstanding arms fixedly connected to the front linkage arms and further connected to the bogie frame by an adjustable spring, a body supporting shaft extending from side to side of the snowmobile body over the approximate longitudinal center of the bogie frame, a coil spring positioned between the supporting shaft and the bogie frame, and double pivoting rearwardly positioned stabilizer arms further connecting the body supporting shaft and the rear portion of the bogie frame. Track tightening apparatus is also positioned adjacent the rear of the bogie frame.

11 Claims, 3 Drawing Figures

PATENTED DEC 26 1972

INVENTOR.
NEIL W. PIERSON
BY
Wicks & Nemer
ATTORNEYS

PATENTED DEC 26 1972
3,707,198
SHEET 2 OF 2

INVENTOR.
NEIL W. PIERSON
BY
Wicks & Nemer
ATTORNEYS

SUSPENSION SYSTEM FOR TRACKED VEHICLES

BACKGROUND

This invention relates generally to tracked vehicles and more specifically to suspension systems for such tracked vehicles.

With the advent and increasing popularity of tracked vehicles, for example snowmobiles, an increasing need exists for improvements in such vehicles especially in the area of the suspension system. As is well known, the suspension system is a highly advantageous and generally necessary portion of a snowmobile to allow for variations in torque from the motor to the track, especially as associated with rapid acceleration of the snowmobile, to thus avoid a climbing action by the front portion, or nose, of the snowmobile. Further, a suspension system is highly advantageous and generally necessary in traversing rough terrain at high speed to give stability to the snowmobile and avoid shaking, throwing, or otherwise causing the dismounting of the driver, and possibly his injury or death. Further, it is a desirable feature of a snowmobile suspension system that it avoid any slackness in the track which may cause a pounding action of the track upon snow thus breaking up snow in front of the track and causing the snowmobile to run deeper in the snow, pull heavier, and thus lose efficiency. Further, it is desirable in a snowmobile suspension system that there be a direct connection between the drive mechanism and the suspension system, and the two not be connected through the body or tunnel of the snowmobile which is the weaker part.

Prior known suspension systems have included deficiencies in one or more of the above areas.

SUMMARY

Thus, the present invention solves the above and other problems of prior suspension systems for tracked vehicles by: providing a suspension system which allows for rapid increases in torque and operates to oppose or prevent any lifting of the snowmobile nose to thus enhance stability; providing improved stability over rough terrain; providing a tight track under all conditions of operation thus avoiding the breakup of snow in front of the track and the attendant inefficiencies; and providing a direct connection between the drive mechanism and the suspension system, thus avoiding the transfer of forces through the weaker body or tunnel member.

A preferred embodiment of the novel suspension system of the present invention includes front linkage arms connected between the drive mechanism and the front portion of the bogie frame, a transversely arranged body supporting shaft, double pivoting stabilizer arms connected between the body supporting shaft and the rear portion of the bogie frame, and a spring between the body supporting shaft and the bogie frame to aid in supporting the body.

It is thus an object of the present invention to provide a novel suspension system for tracked vehicles, such as snowmobiles and the like.

It is a further object of the present invention to provide a novel suspension system for tracked vehicles which is directly connected to the drive mechanism of the vehicle to provide a more efficient transfer of power between the drive mechanism and the track by avoiding any transfer of forces through the vehicle body.

It is a further object of the present invention to provide a novel suspension system for tracked vehicles which allows for and stabilizes reactions of the vehicle due to rapid variations in torque applied to the track and various contours of terrain.

It is still a further object of the present invention to provide a novel suspension system for tracked vehicles which avoids a breakup of snow in front of the track and thus runs shallow and efficient.

These and further objects and advantages of the present invention will become clearer in light of the following detailed description of an illustrative embodiment of this invention described in connection with the drawings.

DESCRIPTION

Figure 1:
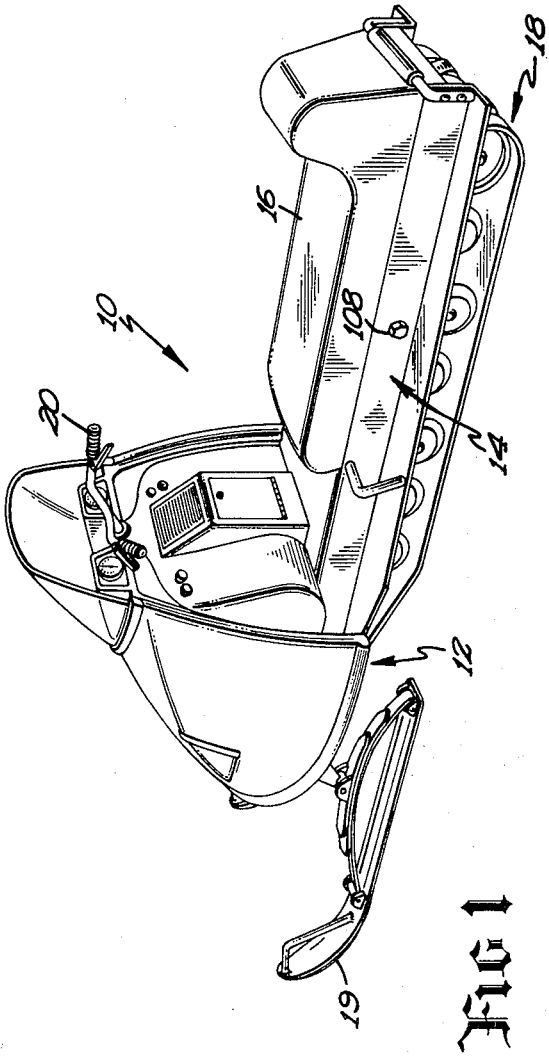
FIG. 1 shows a rear perspective view of a tracked vehicle in the form of a snowmobile incorporating a novel suspension system according to the present invention.

In FIG. 1, a snowmobile generally designated 10 is shown as including the conventional features of a body 12 including a tunnel portion 14 supporting a seat 16, a motor (not shown), a track 18 driven by the motor to propel the vehicle, and snowmobile guiding mechanism in the form of front skis 19 controlled by steering bars 20. With the exception of the system of the present invention providing for suspension of the body 12 upon track 18 and for the transmission of power between the motor (not shown) and the track 18, snowmobile 10 is of conventional design and therefore is not discussed further. The interrelationship of the suspension system of the present invention with the conventional features of snowmobile 10 is best illustrated in FIGS. 2 and 3.

Figure 3:
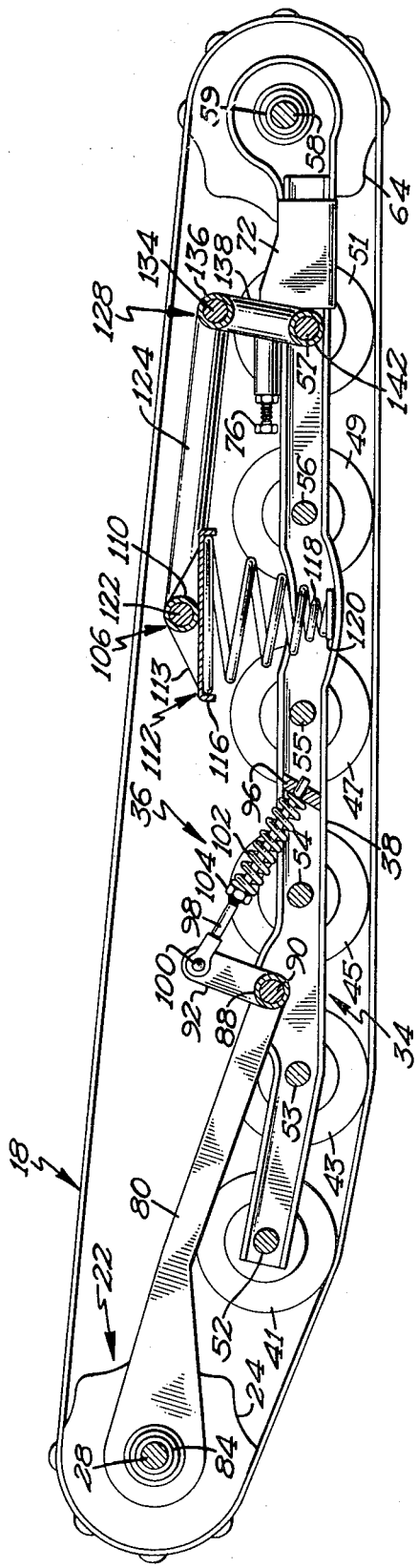
FIG. 3 is a longitudinal cross-sectional view of the suspension system of the present invention according to the section line 3—3 in FIG. 2.
Figure 2:
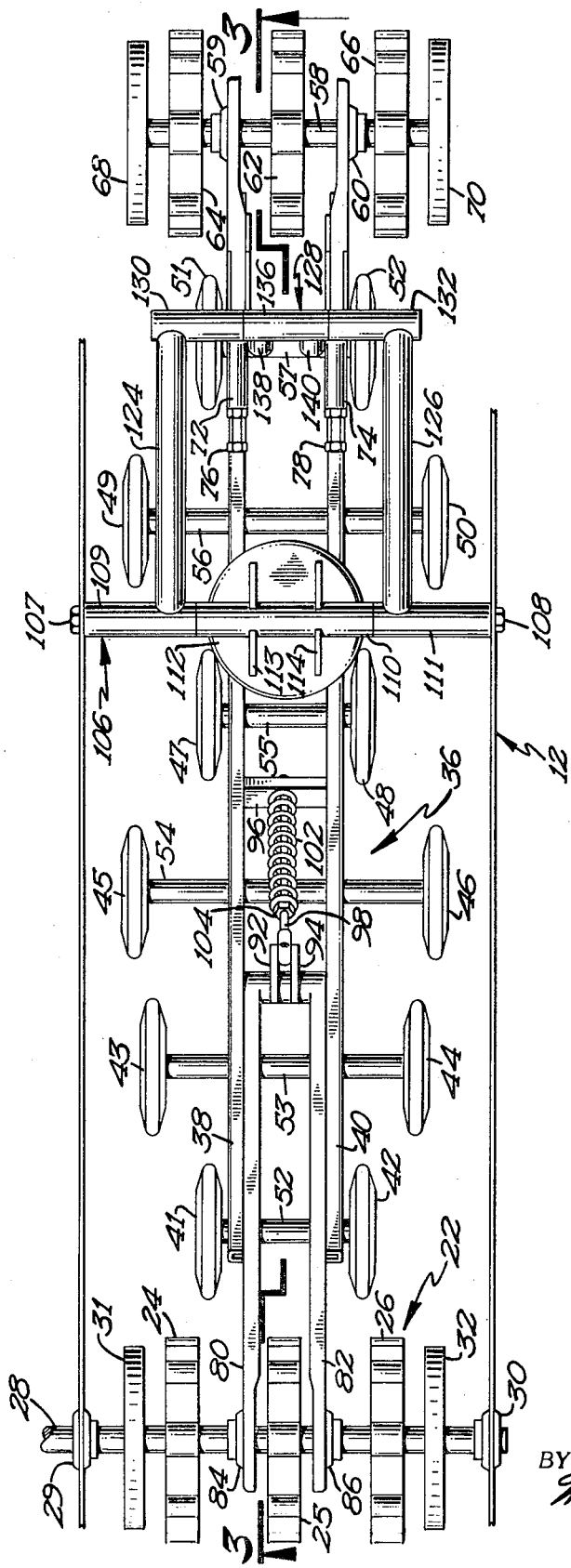
FIG. 2 shows an enlarged top view of the snowmobile of FIG. 1 with the track removed and with the body broken away to expose the drive mechanism and the suspension system of the present invention.

In FIGS. 2 and 3, track 18 is shown as accepting power from a drive mechanism generally designated 22 and specifically from three conventional track drive sprockets 24, 25, and 26 forming a part thereof. While three drive sprockets are shown, no limitation to this number is intended. One centrally located drive sprocket, such as 25, may suffice. Drive mechanism 22 further includes a main drive shaft 28 which rotationally mounts sprockets 24, 25, and 26 and is in turn rotationally connected to body 12, portions of which are shown in FIG. 3, by two conventional main drive shaft tunnel bearings 29 and 30. Further rotationally mounted upon drive shaft 28, one adjacent bearing 29 and one adjacent bearing 30, are two conventional idlers 31 and 32.

In addition to portions of body 12, track 18, and drive mechanism 22, FIGS. 2 and 3 also include the details of a conventional bogie frame, generally designated 34, and a preferred embodiment of a suspension system according to the present invention, generally designated 36, as applied to a snowmobile to provide for the suspension of body 12 and for the transmission of power between drive mechanism 22 and track 18 while maintaining the stability of the snowmobile.

Specifically, in FIGS. 2 and 3 a conventional bogie frame 34 is shown as including a pair of spaced frame members 38 and 40 extending longitudinally of the snowmobile along the intended direction of motion thereof. A plurality of conventional bogie wheels, 41 to 52, are conventionally arranged in pairs with the frontmost bogie wheels, 41 and 42, rotationally mounted on opposite ends of a shaft 52 extending between and through frame members 38 and 40 transversely to the intended direction of motion of snowmobile 10. Pairs of bogie wheels 43, 44 and 45, 46 and 47, 48 and 49, 50 and 51, 52 are similarly rotationally mounted upon the opposite ends of shafts 53 and 54 and 55 and 56 and 57, respectively. As is conventional, bogie wheels 41 to 52 allow the free movement of track 18 around bogie frame 34 to thus allow track 18 to propel snowmobile 10. It will be realized by those skilled in the art that bogie wheels 41 to 52 may be replaced by slides to serve the same purpose, and the present invention makes no distinction between these two types of support or others.

At the rear of bogie frame 34, a rear idler shaft 58 is mounted between and through frame members 38 and 40 by means of a pair of bearings 59 and 60 to rotationally mount a first rear idler sprocket 62 between frame members 38 and 40. An additional rear idler sprocket 64 is further mounted outside of frame members 38 and 40 adjacent frame member 38, and a further rear idler sprocket 66 is similarly mounted outside of frame 40. While three idler sprockets are shown, again, no limitation to this number is intended.

Track 18 is then conventionally supported upon and moves over and around front sprockets 24, 25, and 26 and front idlers 31 and 32, bogie wheels 41 to 52, rear sprockets 62, 64, and 66, and rear idlers 68 and 70. Further, the front sprockets are conventionally driven by the motor (not shown) to provide the power to move track 18 and thus provide motive power to snowmobile 10.

Bogie frame members 38 and 40 each include a means for tightening track 18 in the form of brackets 72 and 74, one arranged upon each frame member. Specifically, each frame member is formed of two interfitting pieces longitudinally slidable with respect to one another in a direction parallel to the intended direction of motion of the snowmobile, and a bracket is fixedly attached to the rearmost of these frame pieces in a manner to surround the frontmost frame piece and thus secure the two pieces. Threaded bolt assemblies 76 and 78 are arranged, one with respect to each bracket, to apply rearward pressure which separates the frontmost and rearmost frame pieces until track 18 is tightened and thereby prevents further longitudinal motion of the frontmost and rearmost frame pieces with respect to one another.

Suspension system 36 includes a pair of front linkage arms 80 and 82 symmetrically arranged about the longitudinal axis of snowmobile 10, in the intended direction of motion, and pivotally connected between drive mechanism 22 and the front portion of bogie frame 24. Specifically, the frontmost ends of arms 80 and 82 are rotationally mounted upon drive shaft 28 by means of bearings 84 and 86 symmetrically arranged one on each side of sprocket 25, and the rearmost ends of arms 80 and 82 are joined together by a cross-member 88. A linkage arm pivot pin 90, best seen in FIG. 3, is secured within raised portions of bogie frame members 38 and 40 to pivotally mount cross-member 88 and thus the rearmost ends of front linkage arms 80 and 82 to frame members 38 and 40 of bogie frame 34. Two spaced, parallel control lever arms, 92 and 94, each have one end connected to cross-member 88 in a manner to extend from cross-member 88 in a direction substantially perpendicular to the longitudinal axis of linkage arms 80 and 82. A further cross-member 96 extends between frame members 38 and 40 of bogie frame 34 and is longitudinally spaced from pivot pin 90, and a shaft 98 is connected between further cross-member 96, and a shaft 100 journaled between the upper free ends of arms 92 and 94 opposite cross-member 88. A spring 102 is positioned upon shaft 98 between cross-member 96 and an adjustment nut 104 is threaded upon shaft 98 for adjusting the tension of spring 102. The interconnection of spring 102, shaft 98, arms 92 and 94, arms 80 and 82, and drive mechanism 22 is such that as arms 80 and 82 rotate clockwise about driveshaft 28, this movement is resisted and retarded by the action of spring 102 acting through control arms 92 and 94.

Suspension system 36 further includes a body and stabilizer supporting shaft 106 arranged in a direction transverse to the intended direction of motion of the snowmobile 10 in a manner to support at least a portion of body 12. Two bolts, 107 and 108, secure opposite ends of shaft 106 to body 12.

Shaft 106 includes three tubular sections, 109, 110 and 111, with the central section 110 secured to a disk-like spring support 112 by a fixed connection with the top of spring support 112 and with ribs 113 and 114 formed integrally therewith. Spring support 112 includes an annular depending flange 116, best seen in FIG. 3, which retains the top portion of a coil spring 118 to hold spring 118 between the bottom of spring retainer 112 and a plate 120 carried by bogie frame 34.

Body supporting shaft 106 further includes a bearing rod 122 which extends centrally throughout tubular sections 109, 110, and 111 to extend beyond the ends of these sections and receive bolts 107 and 108. Bearing rod 122 thus rotationally mounts tubular sections 109 and 111 between center sections 110 and the opposite sides of body 12.

A pair of rear stabilizer arms 124 and 126 are fixedly connected, one to tubular section 109 and one to tubular section 111, to extend rearwardly and interconnect body supporting shaft 106 with a rear stabilizer shackle 128. In particular, stabilizer arm 124 is fixedly connected between tubular section 109 of supporting shaft 106 and a similar tubular section 130 of rear shackle 128, and stabilizer arm 126 is similarly connected between tubular section 111 and a similar tubular section 132 of shackle 128. Tubular shackle sections 130 and 132 are journaled upon a pivot pin 134 held by a central tubular shackle section 136, with the interconnection of pivot pin 134 and tubular sections 130, 132, and 136 defining a transversely arranged cylindrical member. Rear shackle 128 further includes a pair of descending arms 138 and 140 having ends fixedly connected between center tubular section 136 and a further tubular section 142 arranged transversely to the intended direction of motion of the snowmobile 10 and journaled upon shaft 57 supporting bogie wheels 51 and 52.

Thus, the connection between body supporting shaft 106, arms 124 and 126, stabilizer shackle 128, and shaft 57 provides a double pivoting rear stabilizing action to snowmobile 10, as will be further explained hereinafter.

OPERATION

Now that the various parts of the preferred embodiment of the novel suspension system according to the present invention have been explained for a snowmobile, the operation and cooperation thereof with the remainder of the parts of snowmobile 10 may be explained.

First, since shaft 106 supports body 12 and thus any rider upon seat 16, coil spring 118 provides primary support for maintaining snowmobile body 12 and any rider thereon in an elevated position from the snow surface. Coil 118 also provides a smoothing action when the snowmobile 10 is driven over rough terrain. Thus, coil 118 provides a first connection between body 12 and bogie frame 34. In the preferred embodiment, it has been found that best stability is obtained when body supporting shaft 106 is positioned approximately centrally of the longitudinal dimension of the bogie frame 34, with respect to the intended direction of motion of the snowmobile, to thus centrally position coil 118 over bogie frame 34.

Front linkage arms 80 and 82 provide another feature of the suspension system of the present invention by directly interconnecting drive means 22 with bogie frame 34 to thus directly transfer power from the drive means 22 to the bogie frame 34 while avoiding a transfer of forces through the weaker element, body 12. Also, as snowmobile 10 moves over rough terrain and the terrain causes upward and downward changes in the vertical positioning of bogie frame 34 with respect to body 12, which changes in positioning are smoothed by coil 118, front linkage arms 80 and 82 allow bogie frame 34 to move upward or downward in relation to the drive mechanism 22, and specifically shaft 28, thus allowing coil 118 to freely smooth the ride. Further, when bogie frame 34 is urged upwards with respect to shaft 28, front linkage arms 80 and 82 pivot between shaft 28 and pivot pin 90 to not only allow bogie frame 34 to move slightly higher with respect to body 12 and thus decrease their vertical separation, but simultaneously cause a corresponding rearward movement between body 12 and bogie frame 34. It is to be noticed that this rearward movement of bogie frame 34 upon the decrease of vertical distance between bogie frame 34 and body 12 maintains a constant tension upon track 18 to thus avoid any slippage of the track 18 with respect to drive mechanism 22. A corresponding but reversed effect occurs upon an increase of vertical separation between body 12 and bogie frame 34. Thus, the combination of the front linkage arms 80 and 82 with coil spring 118 provides a smooth ride while maintaining constant tension on track 18.

Further, the symmetrical arrangement of arms 80 and 82 about drive sprocket 25 provides a measure of side to side stability by balancing the forces between bogie frame 34 and body 12.

The main side to side stabilization of bogie frame 34 with respect to body 12 is provided by the double pivoting arrangement of rear stabilizer shackle 128 and rear stabilizer arms 124 and 126, however. It is to be noticed that the double pivoting arrangement provides side to side stability while allowing bogie frame 34 to move frontwards, backwards, upwards, and downwards in relation to body 12. Further, the use of pairs of arms, such as 124, 126 and 138, 140 allows a better balancing of forces and thus enhances the ability of these components to stabilize side to side movements of bogie frame 34 with respect to body 12.

Another feature of the suspension system 36 of the present invention is its ability to allow for and stabilize the reaction of the snowmobile to rapid variations in torque applied to track 18. For example, assume the rapid application of torque as would occur if the snowmobile driver attempted to rapidly accelerate. This rapid application of torque to tread 18 tends to lift the front of body 12, and hence drive shaft 28, upwards from the snowbed. Under these conditions, arms 80 and 82, which are directly connected between drive shaft 28 and bogie frame 34, attempt to rotate clockwise about shaft 28; however, an attempted clockwise rotation of control arms 80 and 82 about shaft 28 is resisted and retarded by the action of spring 102 positioned on shaft 98 between the ends of control arms 92 and 94 and cross-member 96 interconnecting frame members 38 and 40 of bogie frame 34. That is, an attempted clockwise rotation of arms 80 and 82 likewise provides an attempted clockwise rotation of control arms 92 and 94 which rotation is resisted by the compression of spring 102 between adjusting nut 104 and cross-member 96 while shaft 98 freely passes through an aperture formed within cross-member 96 for that purpose. Thus, any action tending to lift drive shaft 28 is resisted and retarded by the action of spring 102 in cooperation with control arms 92 and 94 to the extent preset through the adjustment of adjusting nut 104.

The ability of the suspension system 36 of the present invention to resist a climbing action tending to lift the front of body 12 of snowmobile 10 is further advantageous in allowing an efficient transfer of power which would not exist if lifting were allowed. Specifically, the climbing action causes a pulling action on the rear idler sprockets 62, 64, and 66 due to the gripping of the track 18 on the snow. This pulling action normally rotates the rear idler sprockets towards the front of the snowmobile, causing the track 18 to become slack between the front drive sprockets 24, 25 and 26 and the first set of bogie wheels 41, 42. This slackness of track 18, which is avoided through use of the present invention, causes a pounding action on the snow upon the revolution of the track and breaks the surface of the snow in front of the track to cause the snowmobile to run deeper in the snow, pull heavier, and thus become less efficient.

Thus, the ability of the suspension system of the present invention to resist a slackening of the track, whether due to rapid acceleration tending to lift the front of snowmobile 10, to changes in vertical separation between body 12 and bogie frame 34, or other causes, prevents slippage of the track upon the driven mechanism and allows a shallow and thus efficient propulsion of snowmobile 10 under various operating conditions. Also, the preferred embodiment of the suspension of the present invention as illustrated in relation to snowmobile 10 provides for a smoothing of a ride across rough terrain, provides for side to side stability, and retards and resists lifting action of the front of the snowmobile upon rapid acceleration.

The invention disclosed herein may be embodied in other specific forms without departing from the spirit or general characteristics thereof, some of which forms have been indicated, and the embodiments described herein are to be considered in all respects illustrative and not restrictive. The scope of the invention is indicated by the appended claims, rather than by the foregoing description, and all changes which come within the meaning and range of equivalency of the claims are intended to be embraced therein.

What is claimed is:

1. In a tracked vehicle, such as a snowmobile and the like, having a body portion, a motor, a shaft mounting a track engaging drive mechanism powered by the motor, a bogie frame, and a track supported upon the bogie frame for moving in response to the drive mechanism to propel the vehicle, a new suspension system, comprising: first arm means pivotally connected between the drive mechanism mounting shaft and a front portion of the bogie frame for maintaining substantially constant tension on the track under various conditions of motor torque output and contour of terrain by allowing pivotal motion of the bogie frame with respect to the drive mechanism; a supporting shaft arranged between the upper and lower track runs in a direction transverse to the intended direction of motion of the vehicle in a manner to support at least a portion of the vehicle body; second arm means having one end connected to the body supporting shaft; third arm means pivotally connected between the second end of the second arm means and a rear portion of the bogie frame for allowing the second and third arm means to stabilize the rear of the bogie frame while allowing the bogie frame as a unit to move upward and downward and forward and backward, with respect to the intended direction of motion of the vehicle, in relation to the vehicle body; and spring means positioned between the supporting shaft and the bogie frame for supporting at least a portion of the vehicle body on the bogie frame.

2. The suspension system of claim 1, wherein the body supporting shaft is positioned approximately centrally of the longitudinal dimension of the bogie frame, with respect to the intended direction of the motion of the vehicle.

3. The suspension system of claim 2, where the bogie frame includes a pair of spaced frame members extending along the intended direction of movement of the vehicle, wherein the first arm means comprises a pair of arms, each arm pivotally connected between the drive mechanism and one of the bogie frame members; wherein the second arm means comprises a pair of arms, each having one end connected to the body supporting shaft; and wherein the third arm means comprises a pair of arms pivotally connected between the second ends of the second arms and the rear portions of the bogie frame members.

4. The suspension system of claim 3, including a pair of fourth arms, with a first fourth arm having one end fixedly connected to one of the pair of first arms in a manner that the second end projects from the first arm in a substantially perpendicular direction to the longitudinal axis of the first arm, and with a first end of the other of the fourth arms fixedly connected to the other of the first arms in a manner that the second end of the fourth arm projects from the other first arm in substantially a perpendicular direction to the longitudinal axis of the other first arm; spring means connected between the second ends of the fourth arms and the bogie frame; and means for adjusting the spring tension on the spring means for maintaining stability between the bogie frame and the vehicle body by retarding the climbing action of the vehicle body with respect to the bogie frame upon rapid acceleration of the vehicle.

5. The suspension system of claim 4, wherein the spring means supporting the vehicle body comprises a coil spring positioned between the bogie frame and the vehicle body.

6. The suspension system of claim 2, wherein the first arm means comprises a pair of arms symmetrically pivotally connected about the longitudinal vehicle axis in the intended direction of motion of the vehicle between the drive mechanism and the front portion of the bogie frame.

7. The suspension system of claim 2, wherein the second arm means comprises a pair of arms, each having one end connected to the body supporting shaft symmetrically about the longitudinal vehicle axis in the intended direction of motion of the vehicle, and wherein the third arm means comprises a pair of arms pivotally connected between the second ends of the second arms and the rear portion of the bogie frame symmetrically about the longitudinal vehicle axis in the intended direction of motion of the vehicle.

8. The suspension system of claim 2, including fourth arm means having one end connected to the first arm means in a manner that the second end of the fourth arm means projects from the first arm means in a direction other than along the longitudinal axis of the first arm means; spring means connected between the second end of the fourth arm means and the bogie frame; and means for adjusting the spring tension of the spring means for maintaining stability between the bogie frame and the vehicle body by retarding the climbing action of the vehicle body with respect to the bogie frame upon rapid acceleration of the vehicle.

9. The suspension system of claim 1, wherein the first arm means comprises a pair of arms symmetrically pivotally connected about the longitudinal vehicle axis in the intended direction of motion of the vehicle between the drive mechanism and the front portion of the bogie frame.

10. The suspension system of claim 1, wherein the second arm means comprises a pair of arms, each having one end connected to the body supporting shaft symmetrically about the longitudinal vehicle axis in the intended direction of motion of the vehicle, and wherein the third arm means comprises a pair of arms pivotally connected between the second ends of the second arms and the rear portion of the bogie frame symetrically about the longitudinal vehicle axis in the intended direction of motion of the vehicle.

11. The suspension system of claim 1, including fourth arm means having one end connected to the first arm means in a manner that the second end of the fourth arm means projects from the first arm means in a direction other than along the longitudinal axis of the first arm means; spring means connected between the second end of the fourth arm means and the bogie frame; and means for adjusting the spring tension of the spring means for maintaining stability between the bogie frame and the vehicle body by retarding the climbing action of the vehicle body with respect to the bogie frame upon rapid acceleration of the vehicle.

* * * * *